United States Patent
Takada

(10) Patent No.: US 9,799,861 B2
(45) Date of Patent: Oct. 24, 2017

(54) TERMINAL COVERING RESIN FILM FOR SECONDARY CELL, TAB MEMBER FOR SECONDARY CELL, AND SECONDARY CELL

(71) Applicant: Toppan Printing Co., Ltd., Taito-ku, Tokyo (JP)

(72) Inventor: Takehisa Takada, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 0 days.

(21) Appl. No.: 14/970,803

(22) Filed: Dec. 16, 2015

(65) Prior Publication Data

US 2016/0099447 A1   Apr. 7, 2016

Related U.S. Application Data

(63) Continuation of application No. PCT/JP2014/069025, filed on Jul. 17, 2014.

(30) Foreign Application Priority Data

Jul. 17, 2013 (JP) .................................. 2013-148673

(51) Int. Cl.
*H01M 2/02* (2006.01)
*H01M 2/08* (2006.01)
(Continued)

(52) U.S. Cl.
CPC .............. *H01M 2/08* (2013.01); *H01M 2/024* (2013.01); *H01M 2/0262* (2013.01);
(Continued)

(58) Field of Classification Search
CPC .... H01M 2/0262; H01M 2/0275; H01M 2/08; H01M 10/052; H01M 2220/20;
(Continued)

(56) References Cited

U.S. PATENT DOCUMENTS 4,576,430 A * 3/1986 Dufresne ............. H01R 11/282
439/429
2001/0051298 A1* 12/2001 Hanafusa ............ H01M 2/0207
429/162
(Continued)

FOREIGN PATENT DOCUMENTS

JP    2000-268789 A    9/2000
JP    2001-102016 A    4/2001
(Continued)

OTHER PUBLICATIONS

Extended European Search Report issued in European Patent Application No. 14826850.1 mailed Dec. 12, 2016.
International Search Report issued in PCT/JP2014/069025 dated Sep. 9, 2014.

*Primary Examiner* — Mark F Huff
*Assistant Examiner* — Monique Wills
(74) *Attorney, Agent, or Firm* — Foley & Lardner, LLP; Michael D. Kaminski

(57) ABSTRACT

A terminal covering resin film for secondary cell, which is attached so as to cover part of an outer surface of a terminal connected to a power generation element of a secondary cell, comprises an innermost layer contacting the terminal, and an outermost layer forming a surface opposite to the innermost layer wherein the innermost layer is a layer of not less than 20 μm in thickness containing an acid-modified polyolefin and a melt flow rate of the innermost layer is not less than 2.0 g/10 minutes.

9 Claims, 4 Drawing Sheets

(51) Int. Cl.
*H01M 2/30* (2006.01)
*H01M 10/0525* (2010.01)
*H01M 2/06* (2006.01)
*H01M 10/052* (2010.01)

(52) U.S. Cl.
CPC ........... *H01M 2/0275* (2013.01); *H01M 2/06* (2013.01); *H01M 2/305* (2013.01); *H01M 10/0525* (2013.01); *H01M 10/052* (2013.01); *H01M 2220/10* (2013.01); *H01M 2220/20* (2013.01)

(58) Field of Classification Search
CPC .. H01M 2/024; H01M 2/305; H01M 10/0525; H01M 2/06
See application file for complete search history.

(56) References Cited

U.S. PATENT DOCUMENTS

2007/0190402 A1\* 8/2007 Kumeuchi .......... H01M 2/0257
 429/53
2007/0207379 A1\* 9/2007 Hatta .................. H01M 2/0207
 429/176

FOREIGN PATENT DOCUMENTS

| JP | 2002-245988 A | 8/2002 |
| JP | 2003-7269 A | 1/2003 |
| JP | 2008-192451 A | 8/2008 |
| JP | 4138172 B2 | 8/2008 |
| WO | WO-2012/020721 A1 | 2/2012 |
| WO | WO-2012/063764 A1 | 5/2012 |

\* cited by examiner

TERMINAL COVERING RESIN FILM FOR SECONDARY CELL, TAB MEMBER FOR SECONDARY CELL, AND SECONDARY CELL

CROSS-REFERENCE TO RELATED PATENT APPLICATIONS

This application is a continuation application filed under 35 U.S.C. 111(a) claiming the benefit under 35 U.S.C. §§120 and 365(c) of PCT International Application No. PCT/JP2014/069025 filed on Jul. 17, 2014, which is based upon and claims the benefit of priority of Japanese Application No. 2013-148673, filed on Jul. 17, 2013, the entire contents of them all are hereby incorporated by reference.

TECHNICAL FIELD

This invention relates to a terminal covering resin film for secondary cell and more particularly, to a terminal covering resin film for secondary cell that exhibits good and stable adhesion to a metal terminal, and a tab member for secondary cell and a secondary cell each making use of the resin film.

This application claims the benefits of priority based on Japanese Patent Application No. 2013-148673, filed Jul. 17, 2013, the content which is incorporated herein by reference.

BACKGROUND

With existing aqueous batteries such as nickel hydrogen and lead batteries, the cell unit voltage has been limited to about 1.2 V in view of the restriction in respect of the electrolytic voltage of water. In recent years, however, the downsizing of mobile devices and effective utilization of natural power generation are needed and thus, a necessity of lithium ion cells, with which a higher voltage is obtained and which is high in energy density, is being increased. For the packaging material used for such lithium ion cells, metal cans have hitherto been in frequent use. Requirements have now been made in respect of the thinning and diversification of products to be applied, under which laminate packaging materials shaped in the form of pouches made of laminates of resin films on an aluminum foil are being widely used because of their low fabrication costs and the like.

A secondary cell formed of a combination of a power generation element, such as a power collector, wherein charge and discharge are performed, and such a laminate packaging material as mentioned above may also be called cell pack or battery cell.

In FIG. 7, an ordinary cell pack is shown as a perspective view. This cell pack 150 includes a cell body 151 wherein a power generation element, not shown, is tightly sealed with a laminate packaging material (hereinafter referred to as "body packaging material") 152, and tabs 153 each serving as an electrode terminal to which electric power is supplied from the cell body 151.

FIG. 8 is a perspective view showing the tab 153. The tab 153 has a lead 154 serving as a metal terminal, and a terminal covering resin film 155 for secondary cell covering part of an outer peripheral surface of the lead 154. The terminal covering resin film for secondary cell may also be called "tab sealant", for which the terminal covering resin film for secondary cell may be sometimes referred to as "tab sealant" hereinafter in the present specification.

In the tab 153, the lead 154 has a first end portion 154A electrically connected to a power generation element inside the body packaging material 152, and a second end portion 154B which is electrically conductive and which is exposed at least a part of the outer surface thereof so as to permit connection with an external device, to which electric power is to be supplied. In the tab sealant 155, at least a part of the end portion 154A is covered with the body packaging material 152.

The tab sealant should have several characteristics.

The first is adhesion between the tab sealant, and the lead and body packaging material. If a space is established between the tab sealant and the lead, or between the tab sealant and the body packaging material, liquid leakage or peeling off may occur at the time of or after fabrication of a cell pack.

The second is to secure insulation. Since the lead is a current output terminal from the cell and should be covered with the tab sealant to keep insulation between the lead and other members.

More particularly, the tab sealant should preferably be excellent in securing the adhesion and insulation between the tab sealant and the lead, and should also preferably be one that tightly covers the periphery of the lead and is good in sealing properties.

To satisfy the above characteristics, a three-layer structure film is bonded to a lead through an acid-modified polypropylene in Patent Literature 1. In Patent Literature 2, an intermediate layer of a three-layer structured tab sealant is made high in melting point to secure insulation, and the adhesion between the tab sealant, and a lead terminal and a packaging material is intended to be secured by means of a relatively low melting surface layer at opposite sides along the thickness.

CITATION LIST

Patent Literature

Patent Literature 1: JP-B-4138172
Patent Literature 2: JP-A-2000-268789

SUMMARY OF THE INVENTION

Technical Problem

In recent years, however, larger-sized secondary cells having high safety are demanded in in-vehicle, stationary and the like applications, and it has been experienced in many cases that technologies set out in Patent Literatures 1 and 2 may not be necessarily satisfactory. For instance, if a secondary cell is made large in size, its tab has to be frequently increased in the width and thickness of a lead from the standpoint of heat dissipation. This entails that materials for the tab sealant that have both higher adhesion and reliable insulation properties are required.

Under these circumstances, the present invention has as its object the provision of a terminal covering resin film for secondary cell that is improved or even excellent in sealability about the periphery of a lead and also in adhesion to the lead and can secure stable insulation.

Another object of the invention is to provide a tab member for secondary cell and a secondary cell, which favorably permit hermetic sealing about the periphery of a lead and can favorably secure insulation.

Solution to Problem

A terminal covering resin film for secondary cell according to one embodiment of the invention is of the type which is attached so as to cover part of an outer surface of a terminal connected to a power generation element of a secondary cell, the terminal covering resin film comprising an innermost layer contacting the terminal and an outermost layer forming a surface opposite to the innermost layer wherein the innermost layer is made of a layer of not less than 20 μm in thickness containing an acid-modified polyolefin, and a melt flow rate of the innermost layer is not less than 2.0 g/10 minutes.

The terminal covering resin film for secondary cell related to the above embodiment may further comprise an intermediate layer between the innermost layer and the outermost layer.

A tab member for secondary cell according to a second embodiment of the invention includes a terminal and the terminal covering resin film for secondary cell, which is attached so as to cover part of an outer surface of the terminal, wherein a thickness of the innermost layer is at a value of not less than 10% of a film thickness of the terminal.

A secondary cell according to a third embodiment of the invention includes a power generation element, the tab member for secondary cell, and a body packaging material covering and hermetically sealing the power generation element and a part of the tab member for secondary cell wherein an inner layer of the body packaging material contacting the power generation element and the tab member for secondary cell has a melting point substantially equal to that of the outermost layer of the terminal covering resin film for secondary cell.

In the secondary cell related to this embodiment, the inner layer and the outermost layer can contain the same resin component.

Advantageous Effects of Invention

When using the metal terminal covering resin film for secondary cell of the invention, improved or even excellent adhesion between the resin film and the lead is obtained and stable insulation can be improved.

When using the tab member for secondary cell and the secondary cell of the invention, there can be provided a secondary cell having a tab whose lead is conveniently hermetically sealed about the periphery thereof and is conveniently secured with respect to insulation.

DESCRIPTION OF REPRESENTATIVE EMBODIMENTS

Figure 1:
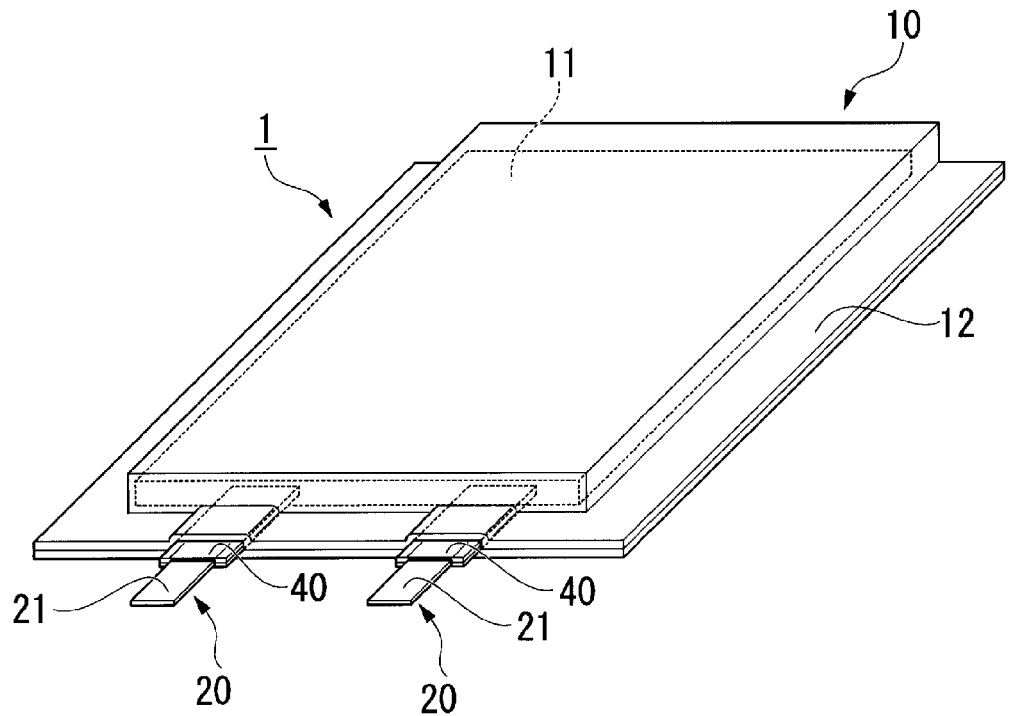
FIG. 1 is a perspective view showing a cell pack according to an embodiment of the invention.
Figure 7:
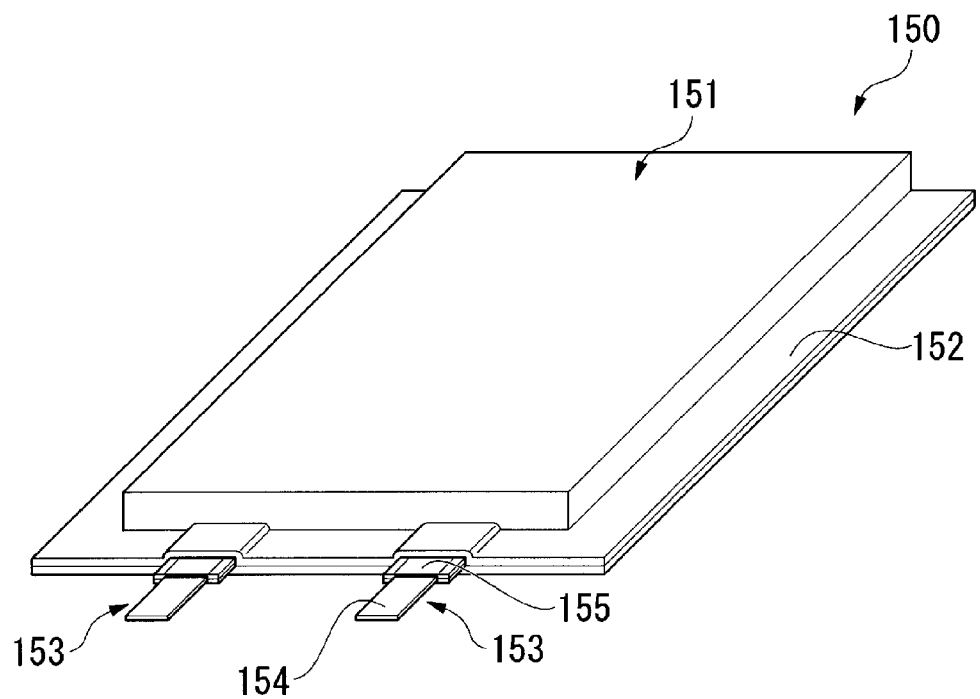
FIG. 7 is a perspective view of an existing cell pack.
Figure 8:
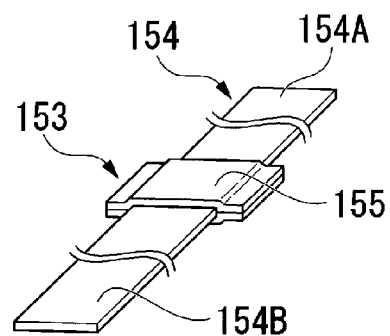
FIG. 8 is a view showing a tab of the existing cell pack.

An embodiment of the invention is illustrated with reference to FIGS. 1 to 5. FIG. 1 is a perspective view showing a cell pack serving as a secondary cell according to the embodiment. The feature of the cell pack resides in a body packaging material and a tab sealant (a terminal covering resin film for secondary battery), and its appearance is not so different from an ordinary cell pack 150 shown in FIG. 7.

A cell pack 1 includes a cell body 10 wherein a power generation element 11 for performing charge and discharge is covered with a body packaging material 12, and a tab 20 functioned as an electrode terminal attached to the cell body. For the power generation element 11, a variety of known power generation elements employed in secondary cells can be used by appropriate selection.

The body packaging material 12 may be one that includes an inner layer contacting the power generation element 11, an outer layer serving as an outer surface of the cell body 10, and a barrier layer formed of a metal or the like. Specific configurations may be appropriately altered.

Figure 3:
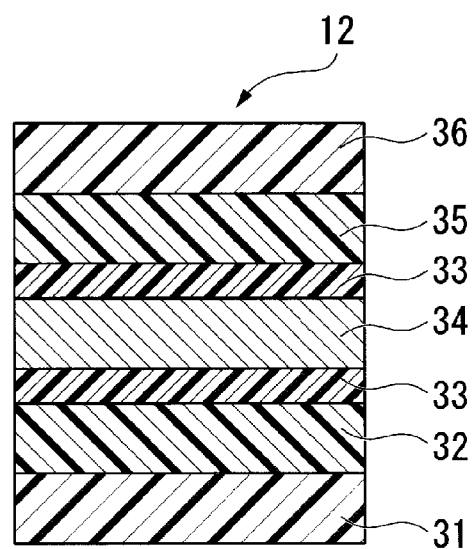
FIG. 3 is a sectional view of an example of a body packaging material of the cell pack.

FIG. 3 shows an instance of a layer structure of the body packaging material 12. In this instance, the body packaging material has a seven-layer structure having, as viewed from the inside contacting the power generation layer 11, an inner layer 31, an inner layer-side adhesive layer 32, a corrosion inhibition treatment layer 33, a barrier layer 34, a corrosion inhibition treatment layer 33, an outer layer-side adhesive layer 35 and an outer layer 36 laminated in this order.

The constituent component of the inner layer 31 includes, for example, a polyolefin resin, or an acid-modified polyolefin resin obtained by subjecting a polyolefin resin to graft modification with maleic anhydride or the like. Examples of the polyolefin resin include: low density, medium density and high density polyethylenes; ethylene-α-olefin copolymers; homo, block or random polypropylene; and propylene-α-olefin copolymers. These polyolefin resins may be used singly or in combination of two or more.

Although depending on the function required, the inner layer 31 may be formed of a single-layer film or a multilayer film wherein a plurality of layers are laminated. For example, in order to impart moistureproof properties, a multilayer film may be used wherein a resin, such as an ethylene-cyclic olefin copolymer or polymethylpentene, is interposed. Moreover, the inner layer 31 may be formed by formulating various types of additives including, for example, a flame retardant, a slipping agent, an anti-blocking agent, an antioxidant, a light stabilizer, a tackifier and the like. The thickness of the inner layer is preferably at 10-150 micrometers (μm), more preferably at 30-80 micrometers (μm). If the thickness of the inner layer is less than 10 μm, there may be some concern that mutual heat-sealing adhesion of the body packaging materials and adhesion between the inner layer 31 and the tab sealant lower. If the thickness of the inner layer 31 exceeds 150 μm, a cost increase is caused. Thus, both cases are undesirable.

For the inner layer-side adhesive later 32, there can be used known materials appropriately selected from ordinary adhesives for lamination and acid-modified thermally fusible resins.

Although the corrosion inhibition treatment layer 33 should preferably be formed in performance on opposite surfaces (front and back surfaces) of the barrier layer 34, it may be formed only on the side of the inner layer 31 in consideration of costs.

For the material of the barrier layer 34, mention is made of aluminum, a stainless steel and the like, of which aluminum is preferred from the standpoint of costs, weight (density) and the like.

The outer layer-side adhesive layer 35 can be made of ordinary adhesives such as polyurethane adhesives comprised mainly of polyester polyols, polyether polyols, acrylic polyols and the like.

For the outer layer 36, there can be used a single-layer film or a multilayer film such as of a nylon, polyethylene terephthalate (PET) and the like. Like the inner layer 31, the outer layer 36 may be formulated with various types of additives including, for example, a flame retardant, a slipping agent, an anti-blocking agent, an antioxidant, a light stabilizer, a tackifier and the like. The outer layer 36 may further include a protective layer by laminating a resin insoluble in an electrolytic solution for a measure against liquid leakage or by coating a resin component insoluble in an electrolytic solution.

Figure 2:
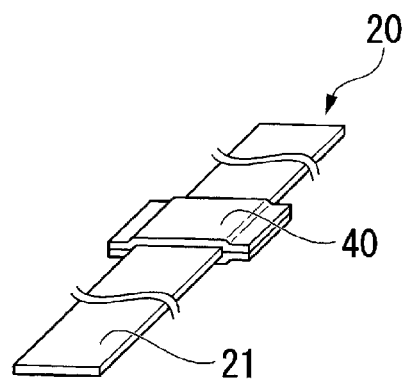
FIG. 2 is a view showing a tab of the cell pack.

FIG. 2 is a perspective view showing a tab 20. The tab 20 includes a conductive lead (terminal) 21, and a tab sealant disposed to cover a part of the outer periphery of the lead 21.

Although metals are usually employed for a material of the lead 21, selection of a specific material should be preferably determined while taking into account the type of material and the structure of the power generation element 11. For instance, with a lithium ion cell, the usual practice for the power generation element 11 is that aluminum is used as a current collector of a positive electrode and copper is for a current collector of a negative electrode. In this case, aluminum is preferably used for the positive electrode terminal of the lead like the current collector, and it is favorable to use an aluminum material having a purity of not less than 97%, such as 1N30, when a corrosion resistance to an electrolytic solution is taken into consideration. Because the lead 21 may be flexed in some cases at a portion where the tab 20 and the body packaging material 12 are thermally sealed (described hereinafter), it is preferred to use an O material, which has been thermally refined by adequate annealing of an aluminum material, for the purpose of imparting flexibility thereto. For the material other than aluminum for use as the lead, there can be used metals, such as stainless steels, which are less likely to be corroded with an electrolytic solution.

With the negative electrode terminal, untreated copper is rarely used in view of its corrosion resistance, and the use of nickel-plated copper, nickel or a stainless steel is preferred.

For the nickel material, carbon-bearing nickel, such as NW 2200, can be used.

As to the thermal refining of nickel materials, it is preferred to use an O material, which has been thermally refined by adequate annealing of a nickel material so as to impart flexibility thereto as with the case of the positive electrode.

Although depending on the size and capacitance of a secondary cell, the thickness of the lead 21 may be not less than 50 μm for cells for small-sized applications and 100 μm-500 μm for cells for large-sized applications such as of electric storage and vehicle installation. Where it is required to reduce an electric resistance for use as a tab, the lead thickness may be further increased.

The width of the lead 21 may depend on the size of an assembled power generation element, and it is usual for small-sized applications to use a lead having a width of about 3-15 mm. For large-sized applications, a lead having a width of about 15-100 mm is used and may be not less than 100 mm in width in some cases. The thickness and width of the lead are appropriately selected depending on the size of and the amount of electric current from a power generation element. More particularly, the sectional area of the lead is increased with an increasing current flowing through a power generation element.

It is effective to subject the outer surface of the lead 21 to corrosion inhibition treatment. With the case of a secondary cell such as a lithium ion cell, a corrosive component, such as $LiPF_6$, is contained in an electrolytic solution, so that the corrosion inhibition treatment is essential for the lead. In this embodiment, a corrosion inhibition layer 22 is formed on the outer surface of the lead 21 (see FIG. 4).

For the lead surface treatment, a chromate treatment or non-chromate treatment is used. According to the lead surface treatment, not only a corrosion resistance is imparted to the outer surface of the lead, but also adhesion between the lead and the tab sealant can be improved. For the purpose of imparting adhesion between the lead and the tab sealant, it is preferred to have a surface treating solution for the surface treatment of the lead contained with a resin component showing good adhesion to a sealant film.

Figure 4:
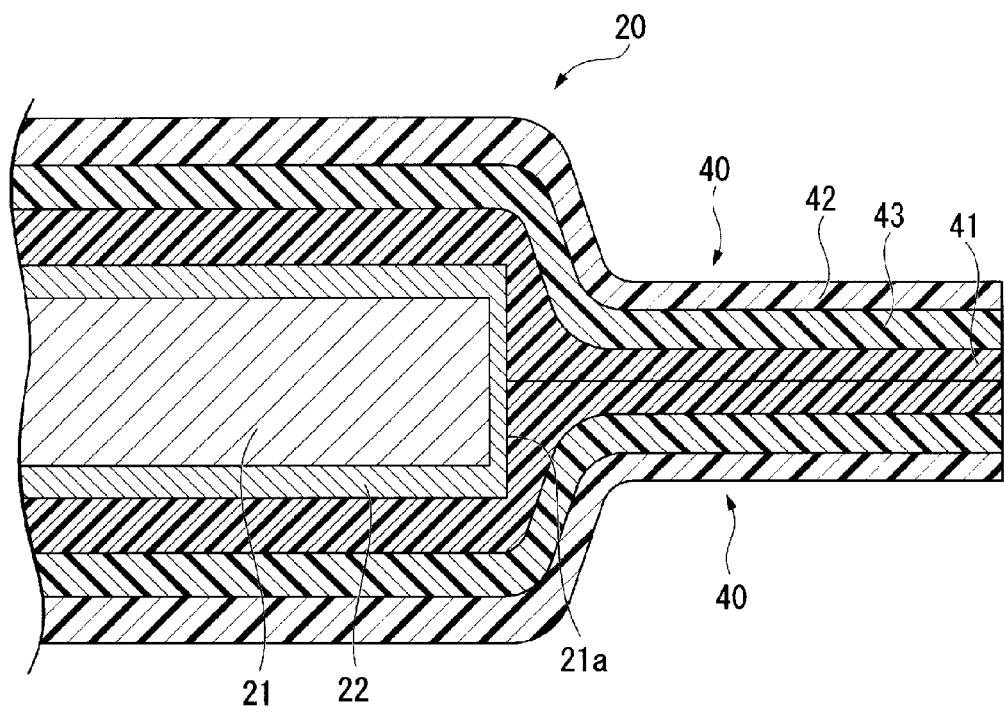
FIG. 4 is an enlarged sectional view showing a portion of the tab covered with a tab sealant.

FIG. 4 is an enlarged sectional view showing a portion of the tab 20 covered with the tab sealant 40. The tab sealant 40 has an innermost layer 41 in contact with the outer surface of the lead 21, an outermost layer 42 forming an opposite surface to the innermost layer 41 (formed at a position opposite to the innermost layer 41), and an intermediate layer 43 provided between the innermost layer 41 and the outermost layer 42.

The innermost layer 41 seals the outer surface of the lead along the periphery thereof and has a function of brining the tab sealant 40 and the lead 21 into intimate contact with each other. Accordingly, the innermost layer is formed of a resin that exhibits excellent adhesion to both the lead 21 and a layer contacting the innermost layer 41 (i.e. the intermediate layer 43 in the present embodiment). In this embodiment, for example, while taking a material of the intermediate layer 43 into account, an acid-modified polyolefin resin obtained by graft-modifying a polyolefin resin with maleic anhydride can be used as the material of the innermost layer 41.

Examples of the polyolefin resin include: low density, medium density and high density polyethylenes; ethylene-α olefin copolymers; homo, block or random polypropylene; propylene-α-olefin copolymers; and the like. These polyolefins may be used singly or in combination of two or more.

The use of an analogous polyolefin resin having good miscibility with the intermediate layer 43 favorably enables adhesion with the intermediate layer to be improved.

The tab 20 is formed by disposing the leads 21 between two tab sealants 40 whose inner layers 41 are facing each other, or sandwiching between the innermost layers 41 of one tab sealant 40 folded back in such a way that the innermost layers 41 are facing each other, and heat-sealing the lead 21 and the tab sealant 40. The opposite surfaces of the lead 21 along the thickness thereof are favorably bonded with the innermost layers of the tab sealant. However, the side face 21a extending along the thickness is substantially vertical to the innermost layer and is less likely to contact the innermost layer. As shown in FIG. 4, the side face 21a of the lead 21 is covered in such a way that part of the innermost layer 41 that is increased in fluidity by heating flows toward the thickness direction of the lead 21. Accordingly, in order that the lead 31 is tightly covered and sealed with the tab sealant 40 along the periphery thereof, importance is placed on the fluidity of the innermost layer during the heat sealing.

Additionally, we have found that the area of the side face 21a increases with an increasing thickness of the lead 21, under which when the thickness of the lead is too large, the constituent material itself of the innermost layer becomes insufficient in quantity to tightly cover the peripheral surface of the lead irrespective of the fluidity of the innermost layer, with the attendant consequence that sealability is not fully secured. More particularly, it is important that the thickness value of the innermost layer in association with the amount of the material of the innermost layer be set while considering the thickness of the lead to be thermally sealed.

We have made intensive studies on the thickness of the innermost layer and, as a result, found that if the thickness of the innermost layer is not less than 10% of the thickness of the lead 21, the lead is well covered with the innermost layer at the periphery thereof. Moreover, if the thickness of the innermost layer is not less than 20% of the film thickness of the lead 21, better sealing about the lead is obtained and thus, the behavior of adhesion between the tab sealant and the lead is stabilized. In addition, it has also been found that in order to permit the innermost layer to conveniently seal the periphery of the lead therewith, at least a given thickness is needed irrespective of the thickness of the lead and the required thickness of the innermost layer is not less than 20 μm. For instance, where the thickness of the lead 21 is at 50 μm, 10% of the thickness of the lead 21 is at 5 μm. Nevertheless, if the thickness of the innermost layer is 5 μm, sealing is inadequate in practice, and stable sealing can be performed by increasing the thickness of innermost layer to 20 μm.

Although no technical limitation is present with respect to the upper limit of the thickness of the innermost layer, the thickness is preferably set at not larger than the thickness of the lead 21 in view of material costs and also in view of concern that in the case where the tab 20 becomes too thick, the difficulty level of heat sealing increases due to that only the portion becomes thick and a heat quantity necessary for a heat sealing step increases.

The melt flow rate (MFR), which is an index showing the fluidity of the innermost layer during heating, is preferably not less than 2.0 g/10 minutes. It has been found that if MFR is less than 2.0 g/10 minutes, sealing about the lead is liable to be insufficient due to reduced fluidity. On the other hand, if the upper limit of MFR exceeds 20 g/10 minutes, the resin flows so easily that the film formation of the innermost layer becomes difficult along with the possibility that the innermost layer flows excessively during sealing, so that the innermost layer partially becomes too thin. Especially, at a corner portion 21b where the opposite faces of the lead 31 along the thickness direction (i.e. upper and lower surfaces of the lead 21 along the thickness) and the side face 21a are connected, the innermost layer 41 is liable to become thin. When an external force acts on the tab 20, a stress is apt to be concentrated at the corner 21b. If the innermost layer at the corner is thin, the innermost layer or the tab sealant as a whole is broken due to the stress, with the possibility that the insulation is impaired. Accordingly, it is preferred that MFR of the innermost layer is not too high.

The melting point of the innermost layer 41 is preferably within a range of from 130° C. to 160° C., more preferably from 135° C. to 150° C.

If the melting point of the innermost layer is lower than 135° C., satisfactory heat resistance cannot be obtained. If the melting point of the innermost layer is not lower than 160° C., temperatures have to be increased during heat sealing between the innermost layer 41 of the tab sealant 40 and the lead 21, resulting in a difficulty of heat sealing between the tab sealant 40 and the lead 21. More particularly, when the melting point of the innermost layer 41 is 160° C. or over, excessive heat application to the tab sealant during heat sealing may cause a lowering in film thickness of the tab sealant 40.

For the outermost layer 42, there is used a thermally fusible resin capable of heat sealing. Part of the outermost layer 42 is heat-sealed with the body packaging material 12, so that a resin of a similar type as for the body packaging material is usually used and a polyolefin resin is used therefor.

Examples of the polyolefin resin include: low density, medium density and high density polyethylenes; ethylene-α-olefin copolymers; homo, block or random polypropylene; propylene-α-olefin copolymers; and the like. These polyolefins may be used singly or in combination of two or more.

Although the use of an ordinary polyolefin resin enables adhesion between the tab sealant and the packaging material to be obtained to some extent, we have found that when the same resin component as used in the inner layer 31 of the body packaging material 12 is incorporated in the outermost layer 42, adhesion between the tab sealant and the packaging material is remarkably improved. It will be noted that in the practice of the invention, "the same resin component" indicates compounds having the same melting point and MFR with each other. With polypropylenes, for example, compounds whose melting point and MFR are not the same are not defined as "the same resin component".

For the inner layer 31 of the body packaging material 12, such a resin mainly comprised of polyethylene or a polyolefin as mentioned above is used, to which various components, such as an anti-blocking agent, a lubricant, an antioxidant and the like, are added. In the practice of the invention, the same component as in the inner layer is contained in the outermost layer, miscibility between the outermost layer 42 and the inner layer 31 can be improved, thereby improving the adhesion between the tab sealant and the packaging material.

Additionally, if the inner layer 31 and the outermost layer 42 are substantially equal to each other with respect to the melting point, good adhesion and sealability can be obtained in the fabrication of the cell pack 1 because of simultaneous melting of the inner layer 31 and the outermost layer 42 in the course of the heat sealing for packaging the power generation element 11 with the body packaging material 12.

Although the adhesion between the outermost layer 42 and the inner layer 31 is improved during heat sealing in the case where the outermost layer 42 and the inner layer 31 do not contain the same resin component therein, but the melting points of the both are made substantially at the same level (e.g. a difference in melting point therebetween is 5° C. or larger), a given effect is thus obtained. In this connection, however, when the same resin component is incorporated in both layers, miscibility is improved as mentioned above, and the adhesion and sealability between the outermost layer 42 and the inner layer 31 are improved, thus being favorable. Specific examples include the use of random polypropylene in both inner layer and outermost layer, the complete identification in formulation of the inner layer and outermost layer, and the addition of a part of the resin contained in the inner layer to the outermost layer.

The melting points of the inner layer 31 and the outermost layer 42 are preferably within a range of from 130° C. to 160° C., more preferably from 135° C. to 150° C., respectively.

If the melting points of the inner layer 31 and the outermost layer 42 are, respectively, less than 135° C., an adequate heat resistance cannot be obtained. If the melting points of the inner layer and the outermost layer 42 are not less than 160° C., respectively, the temperature of heat sealing between the inner layer 31 of the packaging material 12 and the outermost layer 42 of the tab sealant becomes so high that heat sealing between the packaging material 12 and the tab sealant 40 becomes difficult. More particularly, application of excessive heat may cause the film thickness of the tab sealant to be lowered.

The MFR values of the inner layer 31 and the outermost layer 42 are favorably at not less than 2.0 g/10 minutes, respectively, like the innermost layer. Although not so severe as with the innermost layer, fluidity during heat sealing is important so as to secure adhesion as a result of melting and solidifying of the inner layer 31 and the outermost layer 42 during heat sealing. If the MFR values of the inner layer 31 and the outermost layer 42 are not less than 2.0 g/10 minutes, respectively, the molten resins of the inner layer 31 and the outermost layer 42 flow well, thus enabling the clearance gap between the inner layer and the outermost layer to be filled with the resin, thereby leading to improved tight sealing properties of the battery cell.

The thickness of the outermost layer 42 is preferably not less than 10 μm. If the thickness of the outermost layer is less than 10 μm, the heat-sealed portion between the tab sealant and the body packaging material is reduced in area, with the possibility that adhesion between the tab sealant and the body packaging material becomes instable. As to the upper limit in thickness of the outermost layer, although no specific limitation is placed thereon, this thickness is preferably designed in balance with the thickness of the tab sealant as a whole. If the thickness of the outermost layer is increased, fabrication costs increases by an increment in thickness of the outermost layer, thus being unfavorable in a general sense. However, in the case where the lead or an intermediate layer described hereinafter are thick, a thickness increase is not always prohibited, if necessary.

The intermediate layer 43 is not essential for the tab sealant of the invention and is preferably provided in view of insulation. For the material of the intermediate layer, the use of a material whose melting point is higher than those of the innermost layer and the outermost layer is preferred in order that such a material can withstand melting during heat sealing of the innermost layer and the outermost layer. In particular, although the usual practice is to use polyolefins from the standpoint of adhesion between the intermediate layer and the innermost layer and also between the intermediate layer and the outermost layer, the use of a polyester such as PET or a heat-resistant resin is possible if it is intended to further improve insulation.

When using a polyolefin for the intermediate layer 43, its melting point is preferably within a range of from 130° C. to 160° C., more preferably from 135° C. to 150° C., like the inner layer 31. As set out above, the melting point of the intermediate layer 43 should preferably be higher than the melting point of the inner layer 31. Particularly, a difference in melting point between the intermediate layer 43 and the inner layer 31 is favorably at 5° C. or larger (i.e. the melting point of the intermediate layer 43 is higher by not less than 5° C. than the melting point of the inner layer). The melting point of the intermediate layer is set in such a way that a melting point difference from the innermost layer is not less than 5° C. is preferred in view that even if the MFR values of the inner layer 31 and the outermost layer 42 are as high as not less than 2.0 g/10 minutes, insulation can be secured because the intermediate layer is unlikely to be melted during heat sealing with the lead and also with the packaging material thereby keeping the film thickness of the intermediate layer and finally keeping the film thickness of the sealant layer.

On the other hand, the MFR of the intermediate layer is preferably not larger than 10 g/10 minutes from the standpoint of securing insulation.

The intermediate layer is not always made of a single layer, but may have a multilayer structure wherein a plurality of polyester films are bonded through an adhesive. The thickness of the intermediate layer is preferably at 10-200 μm, more preferably at 20-100 μm. If the intermediate layer is in the form of a multilayer structure, the total thickness should be within such a range as indicated above. If the thickness of the intermediate layer is less than 10 μm, an insulation-improving effect is reduced. If over 20 μm, the cost increase is caused. In this regard, however, as to the intermediate layer, balances with the lead and the innermost layer are important. If the innermost layer or lead is formed thick, the intermediate layer may be made correspondingly thick.

Figure 5:
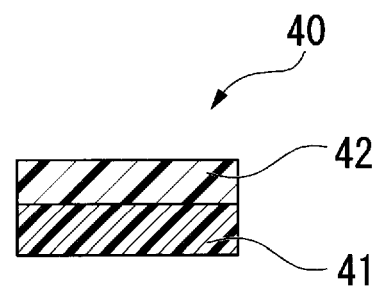
FIG. 5 is a sectional view showing another configuration example of the tab sealant.
Figure 6:
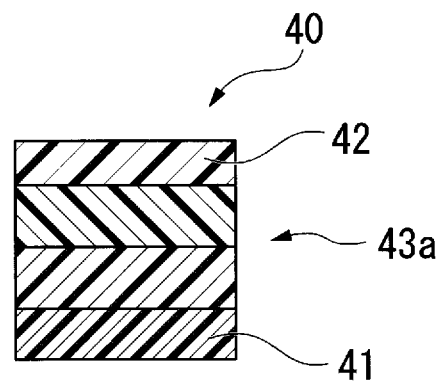
FIG. 6 is a sectional view showing still another configuration example of the tab sealant.

FIG. 5 shows an example of a sectional view of a tab sealant in the absence of an intermediate layer, and FIG. 6 shows an example of a sectional view of a tab sealant in the form of a four-layer structure provided with a double-layer structured intermediate layer 43a.

No specific limitation is placed on the fabrication method of the tab sealant 40. Although fabrication methods including extrusion molding methods such as a T die method, a round die method and the like are useful, a multilayer inflation molding method is preferred. In general, materials whose MFR is not larger than 10 g/10 minutes have been frequently used as a material of the tab sealant. With the T die method, the film formation of a tab sealant is not stabilized and is rather difficult in most cases. The inflation molding is suited for the fabrication of a tab sealant because of the stable formation of a film by use of such a material as indicated.

The extrusion temperature in the extrusion molding of the tab sealant 40 is preferably at 180-300° C., more preferably at 200-250° C. If the extrusion temperature is lower than 180° C., resin melting becomes inadequate, with the possibility that the extrusion from a screw becomes instable owing to too large a melt viscosity. On the other hand, where the extrusion temperature exceeds 300° C., resin oxidation or deterioration occurs vigorously, thus lowering the quality of film. The revolutions of a screw, blow ratio, take-over speed and the like may be appropriately set in consideration of a preset film thickness. The thickness ratios of the respective layers of the tab sealant can be adjusted by changing the revolutions of the respective screws.

It will be noted that the tab sealant of the invention can be fabricated according to methods other than the multilayer extrusion molding, such as a dry lamination using an adhesive, a method of laminating formed films by dry lamination, and the like.

The fabrication procedure of the cell pack 1 making use of such constituent layers as set out above is now described.
(Fabrication of a Tab)

The tab sealant 40 and the lead 21 are heat sealed by melting the innermost layer 41 by application of heat and bringing the tab sealant 40 and the lead 21 into intimate contact with each other under pressure at the same time. In order to obtain adequate adhesion and sealability between the tab sealant 40 and the lead 21, heating is performed to a temperature higher than the melting point of a resin material for the innermost layer 41.

On this occasion, the heating temperature should preferably be at a level not higher than the melting point of a resin material of the outermost layer 42 so as to prevent the entirety of the tab sealant from being melted. If the tab sealant 40 includes the intermediate layer 43, the heating temperature is preferably at the melting point or less of the resin material of the outermost layer 42. For instance, the heating temperature is appropriately at about 140° C.-170° C. The heating and pressurizing time should be determined in consideration of peeling strength and productivity and is preferably at about 1-60 seconds. In this regard, however, where priority is given to a production takt, it is possible to perform heat sealing at a heating temperature exceeding 170° C. while using a shorter pressurizing time. For example, there can be set such conditions of 170-200° C. and 3-20 seconds.

(Covering of Power Generation Element)

One terminal end of the thus fabricated tab 20 is electrically connected to the power generation element 11, and part of the power generation element 11 and the tab 20 are tightly sealed with the body packaging material 12, thereby completing the cell pack 1. On this occasion, the facing inner layers 31 of the body packaging material 12 are mutually heat sealed along the peripheral edge of the power generation element 11. At a portion of covering the tab 20 with the inner layer 31, heat sealing is performed while sandwiching the tab (the lead alone, the lead 21 and the tab sealant 40), so that the heat quantity needed is larger than for the mutual heat-sealing of the inner layers The heat-sealing temperature conditions of the body packaging material 12 are preferably at 160-210° C.

If the heat-sealing temperature of the body packaging material 12 is lower than 160° C., an adhesion failure between the body packaging material 12 and the tab sealant 40 is liable to occur due to the insufficient melting of the tab sealant 40. In the case where the heat-sealing temperature of the body packaging material 12 exceeds 210° C., a material ordinarily employed for the outermost layer 36 (e.g. a nylon or the like) may be melted down.

The heat-sealing time is favorably at 1-10 seconds. If less than one second, an adhesion failure is liable to occur due to insufficient melting. If over 10 seconds, takt is prolonged to lower the productivity.

The portion at which heat sealing is performed while sandwiching the tab becomes thicker than the other portions. Accordingly, a recessed portion may be formed in a heat sealing bar such as by spot facing so that a compression pressure is conveniently applied to a portion at which the body packaging material alone is heat sealed around the tab.

As having stated above, according to the tab sealant of the present embodiment, the innermost layer is made of a layer of 20 μm or larger in thickness containing an acid-modified polyolefin, and the MFR value of the innermost layer 41 is not less than 2.0 g/10 minutes. Hence, when heat sealed to the lead 21, the innermost layer favorably flows in a manner sufficient to enable part of the outer surface of the lead 21 including the side face 21a to be favorably sealed along its peripheral direction.

According to the cell pack of the present embodiment, when the thickness of the innermost layer of the tab sealant 40 is set not less than 20 μm and also not less than 10% of the thickness of the lead 21, there can be obtained a cell pack wherein the lead 21 can be appropriately sealed along the periphery thereof and the reliability of insulation is high.

Further, when the same resin component is contained in both the outermost layer 42 of the tab sealant 40 and the inner layer 31 of the body packaging material 12, good adhesion between the body packaging material and the tab sealant is ensured thereby providing a cell pack wherein liquid leakage can be conveniently prevented. Similar effects are obtained when the melting points of the outermost layer 42 and the inner layer 31 are made substantially equal to each other. When both requirements are satisfied, better effects can be obtained.

The tab sealant and cell pack of the present embodiment are further illustrated by way of examples and comparative examples. The present embodiment should not be construed as limited to the specific contents of examples. Initially, procedures common to both examples and comparative examples are described.

Tab Making

Two types of leads having thicknesses of 100 μm and 400 μm, each having a width of 4 mm and a length of 300 mm, were provided. The material therefor was made of aluminum for a positive electrode side lead and nickel for a negative electrode side lead, respectively. Both positive and negative electrodes were, respectively, subjected to a non-chromium surface treatment on opposite surfaces thereof.

Although the details of the formulation, thickness and the like of the tab sealant were described in the respective examples, the tab sealant used had a width of 15 mm and a length of 10 mm. The leads were placed between two tab sealants such that the innermost layers 41 were in face-to-face relation with each other, followed by heat sealing under conditions of 155° C. and 10 seconds.

Cell Pack Making for Evaluation

For a body packaging material, there was used a packaging material having a configuration including an outer layer of a nylon (with 25 μm in thickness), a barrier layer of an aluminum foil (with 40 mm in thickness and made of A8079-O material), an inner side adhesive layer of acid-modified polypropylene (hereinafter referred to as PPa and having a thickness of 30 μm), and an inner layer of polypropylene (hereinafter referred to as PP and having a thickness of 40 μm). The aluminum foil was subjected to non-chromium surface treatment on opposite surfaces thereof to form a corrosion inhibition treatment layer. For the PP, block polymerized PP having a melting point of 153° C. was used.

The body packaging material was formed as a 50 mm×90 mm rectangle and double-folded at the center point of the long side thereof to form a double-folded portion with a length of 45 mm. The positive and negative electrode tabs were sandwiched at one side of the double-folded portion, followed by heat sealing under conditions of 190° C. and 5 seconds.

The heat sealing for the other side was carried out at 190° C. for 3 seconds. Next, the 50 mm long side portions were bonded by heat sealing, followed by filling 2 ml of an electrolytic solution obtained by adding lithium hexafluorophosphate to a mixed solution of diethyl carbonate and ethylene carbonate and finally heat sealing the facing surfaces of the tabs. In this way, there was made a cell pack capable of evaluating the tabs without enclosing a power generation element therein.

Example 1

PPa having an MFR value of 6.0 g/10 minutes and a melting point of 145° C. was used as an innermost layer, PP having an MFR value of 1.8 g/10 minutes and a melting point of 160° C. was used as an intermediate layer, and PP having an MFR value of 8.0 g/10 minutes and a melting point of 153° C. and having the same formulation (hereinafter referred to as "formulation A") as an inner layer of a body packaging material was used as an outermost layer. The resins for the respective layers were laminated by a three-resin three-layer inflation extrusion (hereinafter referred to as inflation method) to provide a tab sealant of Example 1. The conditions of the inflation method were such that the melting temperature was set at 210° C. and the blow ratio was set at 2.2, under which a tab sealant was made in such a way that the thicknesses of the respective layers were each 30 μm and the thickness in total (total thickness) of the three layers was thus 90 μm. A lead having a film thickness of 100 μm was used to provide a tab.

Example 2

A tab sealant of Example 2 was made in the same manner as in Example 1 except that the thickness of the tab sealant was such that the respective layers were each 20 μm in thickness and thus, a total thickness was set at 60 μm. A lead having a thickness of 10 μm was used to provide a tab.

Example 3

The tab sealant was the same as in Example 1, but a lead having a film thickness of 150 μm was used to provide a tab.

Example 4

A tab sealant of Example 4 was made in the same manner as in Example 1 except that the thickness of the tab sealant was such that the respective layers were each 50 μm in thickness and thus, a total thickness was set at 150 μm. A lead having a thickness of 400 μm was used to provide a tab.

Example 5

In Example 5, a tab sealant having a two-layer configuration including an innermost layer and an outermost layer was made without provision of an intermediate layer. The materials of the respective layers and the formation method were the same as in Example 1 wherein the innermost layer was made at a thickness of 30 μm and the outermost layer was at a thickness of 60 μm with a total thickness 90 μm. A lead having a film thickness of 100 μm was used to provide a tab.

Example 6

A tab sealant of Example 6 was made in the same manner as in Example 1 except that PP (hereinafter referred to as "formulation B") obtained by adding, to 30% of PP of the formulation A, 70% of other type of PP (melting point: 153° C.) to have a total MFR value of 9.0 g/10 minutes and a melting point of 153° C. was used for the outermost layer. A lead having a film thickness of 100 μm was used to provide a tab.

Example 7

A tab sealant of Example 7 was made in the same manner as in Example 1 except that PPa having an MFR value of 2.0 g/10 minutes and a melting point of 145° C. was used as the innermost layer, and PP (hereinafter referred to as "formulation C") having an MFR value of 2.5 g/10 minutes and a melting point of 153° C. was used as the outermost layer. A lead having a film thickness of 100 μm was used to provide a tab.

Comparative Example 1

A tab sealant of Comparative Example 1 was made in the same manner as in Example 4 except that the film thickness configuration was such that 10 μm/50 μm/30 μm (innermost layer/intermediate layer/innermost layer, herein and whenever it appears hereinafter) in a total thickness of 90 μm, and the outermost layer was formed of the formulation B. A lead having a film thickness of 100 μm was used to provide a tab.

Comparative Example 2

A tab sealant used was the same as in Example 6, and a lead having a film thickness of 400 μm was used to provide a tab.

Comparative Example 3

A tab sealant of Comparative Example 3 was made in the same manner as in Comparative Example 1 except that no intermediate layer was provided. A lead having a film thickness of 100 μm was used to provide a tab.

Comparative Example 4

A tab sealant of Comparative Example 4 was made in the same manner as in Comparative Example 1 except that PP having an MFR value of 8.0 g/10 minutes and a melting point of 165° C. (hereinafter referred to as "formulation D") was used for the outermost layer. A head having a film thickness of 100 μm was used to provide a tab.

Comparative Example 5

A tab sealant of Comparative Example 5 was made in the same manner as in Example 6 except that PP of the formula D was used for the outermost layer and film formation was carried out by a T die method (extrusion temperature: 230° C.). A lead having a film thickness of 400 μm was used to provide a tab.

Comparative Example 6

A tab sealant of Comparative Example 6 was made in the same manner as in Comparative Example 3 except that PP of the formula D was used for the outermost layer, and film formation was carried out by a T die method (extrusion temperature: 230° C.). A lead having a film thickness of 100 μm was used to provide a tab.

Comparative Example 7

A tab sealant of Comparative Example 7 was made in the same manner as in Comparative Example 4 except that PP of the formula D was used for the outermost layer, and film formation was carried out by a T die method (extrusion temperature: 230° C.). A lead having a film thickness of 100 μm was used to provide a tab.

Comparative Example 8

An attempt was made to make a tab sealant of Comparative Example 8 in the same manner as in Example 7 except that film formation was carried out by a T die method (extrusion temperature: 230° C.) but was in vain. This was considered for the reason that the MFR of the material was too low.

The tabs and cell packs of the respective examples and comparative examples were evaluated according to the following methods.

(Evaluation 1: Film-Forming Properties)

The case where film formation was enabled without involving wrinkles and pinholes during the formation of a tab sealant was judged as acceptable (O). The case of a partly wrinkled film was judged as x, and the case where no film formation was carried out was as xx.

(Evaluation 2: Lead Sealability)

The tabs of the respective examples were each immersed in a highly penetrative dye solution (commercial name: Microcheck, made by Taihokozai Co., Ltd.), and whether or not the dye solution was penetrated between the lead and the tab sealant was visually recognized. The case where the dye solution was penetrated between the lead and the tab sealant was judged as, and the case where no penetration of the dye solution was recognized was judged as acceptable (O).

(Evaluation 3: Adhesion)

A cell pack for evaluation was stored in an environment of 80° C. for one week and 4 weeks, and a cell pack for evaluation wherein an enclosed electrolytic solution was not leaked was judged as acceptable (O).

(Evaluation 4: Insulation)

The insulation between the negative electrode of a cell pack for evaluation and a packaging material was measured by use of a tester. One hundred of specimens of the respective examples except for Comparative Example 8 were subjected to the measurement, and the case where short circuiting occurred in less than 5 specimens was judged as acceptable (O).

The results of the evaluations 1 to 4 are shown in Table 1.

inadequate. In Comparative Examples 2 and 5 wherein the thickness of the innermost layer was less than 10% of the film thickness of the lead and in Comparative Examples 1, 3 and 6 wherein the thickness of the innermost layer was 10% or over of the film thickness of the lead but was less than 20 $\mu$m, both lead sealability and adhesion were not satisfactory. Especially, in Comparative Examples 4-7 wherein the same resin component was not contained in the outermost layer of the tab sealant and also in the inner layer of the body packaging material, adhesion lowered considerably. In the examples, the lowering of adhesion is assumed to be prevented since either one that contains the same component in the outermost layer and also in the inner layer, or one that has an equal melting point in respect to the outermost layer and the inner layer is satisfied.

For the formation of the tab sealant, stable film formation could be performed when using an inflation method. However, as shown in Comparative Examples 5 to 7, film formation according to the T die method was partly difficult. There was an instance where no film formation was possible at all as in Comparative Example 8.

From the above results, it was shown that when using the tab sealant of the invention, there could be stably fabricated a tab and a cell pack, which were excellent in sealability about the lead and adhesion between the tab sealant and the lead, and also in insulation.

The embodiments and examples of the invention have been described hereinabove, and the technical scope of the invention should not be construed as limited to the embodiments, and combinations of the constituent elements may be changed and many alterations may be added to the constituent elements or removed without departing from the spirit of the invention.

TABLE 1

| | Thickness of tab sealant ($\mu$m) | | | Formulation of outermost layer | Melting point of outermost layer | Fabrication method | Thickness of lead ($\mu$m) | Film formability | Lead sealability | Adhesion | | Insulation |
| --- | --- | --- | --- | --- | --- | --- | --- | --- | --- | --- | --- | --- |
| | Innermost layer | Intermediate layer | Outermost layer | | | | | | | One week | Four weeks | |
| Example 1 | 30 | 30 | 30 | A | Equal to inner layer | Inflation | 100 | o | o | o | o | o |
| Example 2 | 20 | 20 | 20 | A | Equal | Inflation | 100 | o | o | o | o | o |
| Example 3 | 30 | 30 | 30 | A | Equal | Inflation | 150 | o | o | o | o | o |
| Example 4 | 50 | 50 | 50 | A | Equal | Inflation | 400 | o | o | o | o | o |
| Example 5 | 30 | — | 60 | A | Equal | Inflation | 100 | o | o | o | o | o |
| Example 6 | 30 | 30 | 30 | B | Equal | Inflation | 100 | o | o | o | o | o |
| Example 7 | 30 | 30 | 30 | C | Equal | Inflation | 100 | o | o | o | o | o |
| Comparative Example 1 | 10 | 50 | 30 | B | Equal | Inflation | 100 | o | x | o | x | o |
| Comparative Example 2 | 30 | 30 | 30 | B | Equal | Inflation | 400 | o | x | o | x | o |
| Comparative Example 3 | 10 | — | 30 | B | Equal | Inflation | 100 | o | x | o | x | x |
| Comparative Example 4 | 10 | 50 | 30 | D | Different | Inflation | 100 | o | x | x | x | o |
| Comparative Example 5 | 30 | 30 | 30 | D | Different | T die | 400 | x | x | x | x | o |
| Comparative Example 6 | 10 | — | 30 | D | Different | T die | 100 | o | x | x | x | x |
| Comparative Example 7 | 10 | 50 | 30 | D | Different | T die | 100 | x | x | x | x | o |
| Comparative Example 8 | 30 | 30 | 30 | C | Equal | T die | 100 | x x (film not formed) | — | — | — | — |

In the examples, all the items of film formability, lead sealability, adhesion and insulation were acceptable.

On the other hand, with the comparative examples, lead sealability was poor in any cases and adhesion was also

REFERENCE SIGNS LIST

1 cell pack (secondary cell), 11 power generation element, 12 body packaging material, 20 tab (tab member for secondary cell), 21 lead (terminal), 31 inner layer, 40 tab sealant (terminal covering resin film for secondary cell), 41 innermost layer, 42 outermost layer, 43, 43a intermediate layer

What is claimed is:

1. A terminal covering resin film for a secondary cell, comprising:
a terminal covering resin film being attached so as to cover part of an outer surface of a terminal connected to a power generation element of a secondary cell; and
the terminal covering resin film comprising an innermost layer contacting the terminal, and an outermost layer forming a surface opposite to the innermost layer,
wherein the innermost layer is made of a layer of not less than 20 μm in thickness containing an acid-modified polyolefin, and a melt flow rate of the innermost layer is not less than 2.0 g/10 minutes, and
wherein a thickness of the innermost layer is not less than 20% of a film thickness of the terminal.

2. The terminal covering resin film for the secondary cell of claim 1, further comprising an intermediate layer between the innermost layer and the outermost layer.

3. A tab member for a secondary cell, comprising:
a terminal covering resin film being attached so as to cover part of an outer surface of a terminal connected to a power generation element of a secondary cell;
the terminal covering resin film comprising an innermost layer contacting the terminal, and an outermost layer forming a surface opposite to the innermost layer,
wherein the innermost layer is made of a layer of not less than 20 μm in thickness containing an acid-modified polyolefin, and a melt flow rate of the innermost layer is not less than 2.0 g/10 minutes,
wherein the terminal covering resin film is attached so as to cover part of an outer surface of the terminal, and
wherein a thickness of the innermost layer is at a value of not less than 20% of a film thickness of the terminal.

4. A secondary cell, comprising:
a power generation element, the tab member for the secondary cell of claim 3, and an inner layer of a body packaging material contacting the power generation element and the tab member for the secondary cell that has a melting point substantially equal to that of the outermost layer of the terminal covering resin film for the secondary cell.

5. The secondary cell of claim 4, wherein the inner layer and the outermost layer each contain a same resin component.

6. The terminal covering resin film for the secondary cell of claim 1, wherein the acid-modified polyolefin comprises polyolefin modified by maleic acid.

7. The terminal covering resin film for the secondary cell of claim 1, wherein the outer surface is subjected to a chromate treatment.

8. The terminal covering resin film for the secondary cell of claim 1, further comprising:
a corrosion inhibition layer formed on the outer surface of the terminal.

9. The terminal covering resin film for the secondary cell of claim 1, wherein the outermost layer comprises polyethylene terephthalate.

* * * * *